May 23, 1961 H. K. GLEASMAN 2,985,269
COASTER BRAKE FOR VELOCIPEDES AND THE LIKE
Filed Oct. 16, 1958
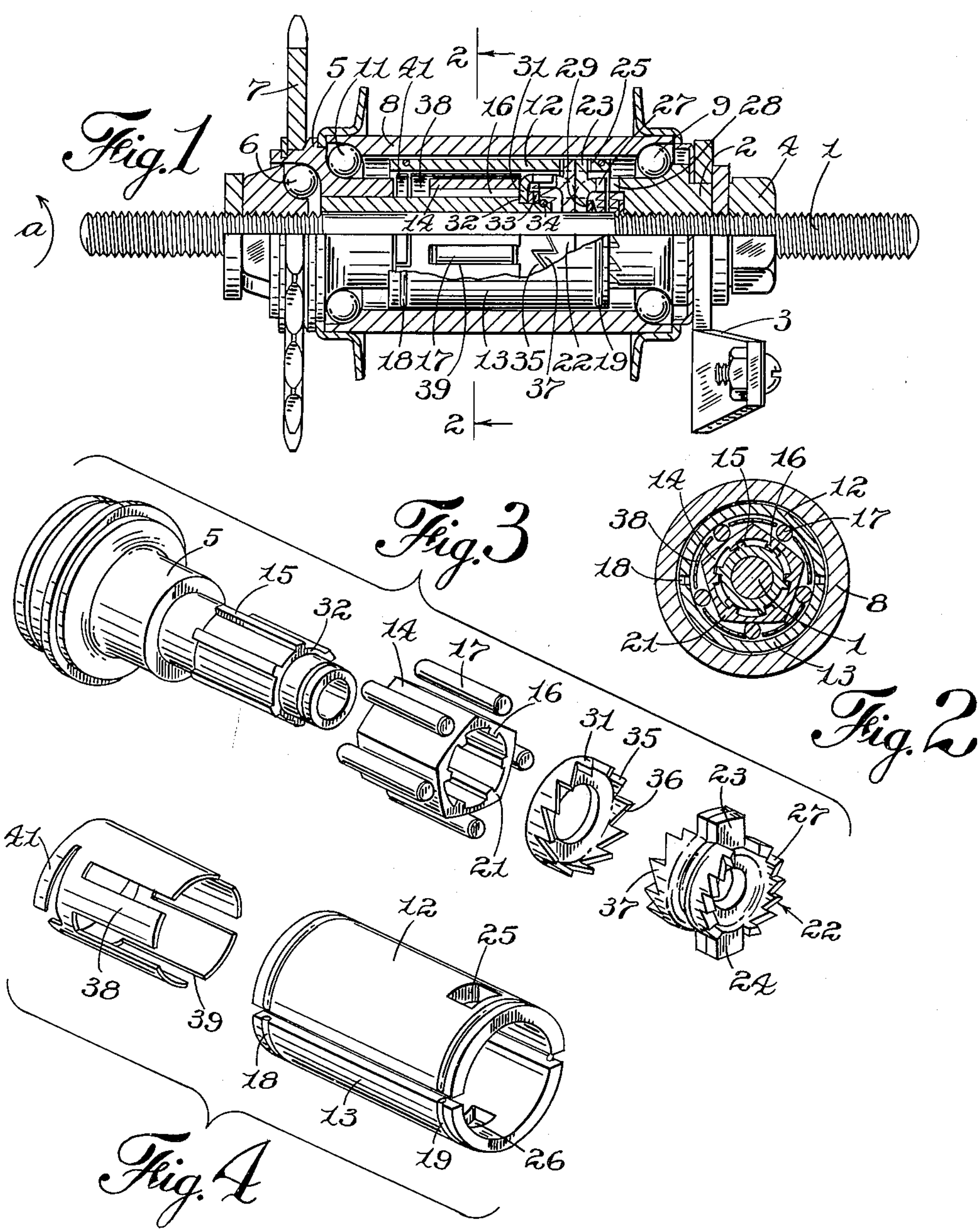
WITNESS:
Esther M. Stockton
INVENTOR.
Hollis K. Gleasman
BY Clinton S. Janes
ATTORNEY United States Patent Office 2,985,269 Patented May 23, 1961

2,985,269

COASTER BRAKE FOR VELOCIPEDES AND THE LIKE

Hollis K. Gleasman, Elmira, N.Y., assignor to The Bendix Corporation, a corporation of Delaware Filed Oct. 16, 1958, Ser. No. 767,659

6 Claims. (Cl. 192—6)

The present invention relates to a coaster brake for velocipedes and the like and more particularly to a hub drive and brake of the roller expander type.

It is an object of the present invention to provide a novel roller type coaster brake which is efficient and reliable in operation and simple and economical in construction.

It is another object to provide such a device in which a single set of rollers and friction elements are used for both driving and braking.

Another object is to provide such a device in which the friction elements are normally free to rotate to drive the hub but upon back pedalling are automatically prevented from rotation.

It is another object to provide such a device in which back pedalling is arranged to automatically bring the frictional elements into anchored relation to the frame of the vehicle.

Further objects and advantages will be apparent from the following description taken in connection with the accompanying drawing in which:

Fig. 1 is a front elevation partly broken away and in section of a preferred embodiment of the invention showing the parts in normal or idle position;

Fig. 2 is a section taken substantially on the line 2—2 of Fig. 1;

Fig. 3 is an exploded detail view in perspective of the driving member and the expanding means and anchoring means for the friction shoes; and Fig. 4 is a similar view of the friction shoes and the retarder sleeve for the expander rollers.

In Fig. 1 of the drawing, there is illustrated an axle 1 adapted to be clamped in the rear fork of a bicycle or the like in the usual manner. An anchor member 2 is threaded on the axle 1 and prevented from rotation by a torque arm 3 which is clamped on a non-circular portion of the anchor member by means of a nut 4, and the outer end of the arm is adapted to be clamped to the fork of the vehicle in the conventional manner.

A driving member 5 is rotatably mounted on the axle 1 as by means of a bearing 6 and has a sprocket 7 fixed thereon for operation by a driving chain. A cylindrical hub 8 is rotatably mounted on the anchor member 2 and the driving member 5 by means of bearings 9 and 11, respectively, and a pair of semi-cylindrical friction shoes 12, 13 (Fig. 4) are loosely mounted in the hub 8. A double acting cam member in the form of a hollow sleeve 14 (Fig. 3) is mounted on the driving member 5 within the friction shoes 12, 13 and is connected to rotate with the driving member by means of splines 15 formed on the driving member in position to cooperate with internal ribs 16 in the cam member 14. The splines 15 and ribs 16 are so spaced as to permit a desired amount of rotary lost motion of the cam member on the driving member.

The cam member 14 is formed exteriorly as a polygonal prism. As here illustrated, it is pentagonal in outline, and a corresponding number of expander rollers 17 are located in contact with the flat faces of the cam member and in bearing engagement with the interior of the friction shoes 12, 13. The dimensions of the parts are such that when the rollers 17 are centrally located in respect to their corresponding faces of the cam member, as illustrated in Fig. 2, the friction shoes 12, 13 are held out of contact with the interior of the hub 8, as by means of a pair of garter springs 18, 19 tending to contract said shoes. Relative planetary movement of the rollers 17 with respect to the cam member 14 in either direction causes the rollers to mount the lobes 21 of the cam member whereby the rollers are forced radially outward and expand the friction shoes 12, 13 into engagement with the interior of the hub 8.

Means are provided, responsive to backward rotation of the driving member in the direction of the arrow (*a*) in Fig. 1, i.e. counter-clockwise when viewed from the left-hand side of the hub illustrated in Figure 1, for preventing rotation of the friction shoes 12, 13 with the hub 8. As best shown in Figs. 1 and 3 this means comprises a coupling member 22 which is non-rotatably connected to the friction shoes 12, 13 by means of radial lugs 23, 24 received in openings 25, 26 in said shoes respectively. The coupling member 22 is formed with laterally extending teeth 27 adapted to engage similar teeth 28 formed on the adjacent face of the anchor member 2.

Means for normally holding the coupling member 22 out of engagement with the anchor member 2 is provided comprising a compression retarder spring 29 located on the axle 1 between said member and in frictional engagement therewith so as to yieldingly resist rotation of the coupling member 22 and consequently of the friction shoes 12, 13.

In order to cause the coupling member to engage the anchor member upon backward rotation of the driving member 5, a shifter ring 31 is mounted on the end of the driving member 5 and pressed against a shoulder 32 on said driving member by means of a compression spring 33 retained on the driving member by a lock ring 34 whereby the shifter ring is frictionally connected for rotation with the driving member. The frictional connection between the shifter ring 31 and the driving member 5 should possess greater torque transmitting capabilities than the frictional connection between the anchor member 2, coupling member 22 and retarder spring 29. Shifter ring 31 is provided with axially directed teeth 35 having inclined surfaces 36 arranged to cooperate with similar teeth 37 formed on the coupling member 22 in opposed relation thereto. The teeth 35, 37 are normally maintained in fully meshed relation by the retarder spring 29 as shown in Fig. 1. However, rotation of the shifter ring 31 in the backward direction with respect to the coupling member 22 will force the latter to the right and thereby cause engagement of its teeth 27 with the teeth 28 of the anchor member 2.

In order to insure the proper engagement and expanding action of the rollers 17 on the friction shoes 12, 13 upon rotation of the cam member 14, a retarder sleeve 38 having axial slots or recesses 39 for receiving the rollers 17, is loosely mounted on the cam member 14 and provided with one or more spring arms 41 bearing frictionally in the interior of the friction shoes 12, 13. The sleeve 38 consequently maintains the rollers 17 properly spaced and yieldingly resists their planetation relative to the friction shoes.

In operation, starting with the parts in the positions illustrated in Fig. 1, rotation of the driving member 5 in a forward direction, contrary to the arrow (*a*) which is clockwise when viewing Figures 1, 3 and 4 from the left-hand side of the axis, causes the cam member 14 to be similarly rotated, after any lost motion is taken up, by engagement of the splines 15 against the ribs 16 of the cam member. Since rotation of the friction shoes 12, 13 is resisted by retarder spring 29, and the rollers 17 are consequently prevented from planetation by means of the retarder sleeve 38, the rollers will be expanded by the lobes 21 of the cam member, thereby bringing the friction shoes 12, 13 into driving engagement in the interior of the hub 8, after which the hub, friction shoes and expander means all rotate in unison as the vehicle is propelled forwardly. When the operator ceases to propel the vehicle and allows the driving member 5 to stop, the hub coasts forward freely overrunning the friction shoes except for the slight initial resistance offered by the retarder spring 29 through the coupling member. The friction shoes are thus rotarially displaced tending towards being centered between the lobes 21 of the cam member and out of driving engagement with the hub. The garter springs 18 and 19 also assist in this centering action.

When the operator desires to apply the brake, he rotates the driving member 5 backwardly, thereby rotating the shifter ring 31 backwardly by reason of the frictional connection afforded by shoulder 32 and compression spring 33 and causing the inclined surface 36 of its teeth 35 to engage complementing inclined surfaces of the teeth 37 and move the coupling member 22 to the right against the pressure of retarder spring 29. This causes engagement of the teeth 27 of the coupling member with the teeth 28 of the anchor member, thus preventing rotation of the coupling member and the friction shoes. This initial backward rotation of the driving member takes place without rotating the cam member 14, due to the lost motion between the splines 15 and ribs 16 of said members.

The traversing movement of the coupling member 22 is assured by the frictional engagement of the retarder spring 29, even though the expansive force of said spring tends to oppose the meshing movement of the coupling.

After the lost motion between the driving member 5 and cam member 14 has thus been taken up, the cam member is rotated backward with the driving member, causing the rollers 17 to be forced outward by the lobes of the cam, thereby expanding the shoes 12, 13 into frictional engagement with the interior of the hub 8. Since the shoes are at this time prevented from rotation by virtue of the engagement of coupling member 22 with anchor member 2, such frictional engagement of the shoes 12, 13 serves to retard the rotation of the hub. The backward rotation of the driving member 5 after the coupling member 22 has come into engagement with the anchor member 2, thus immobilizing the coupling member and shifter ring 31, is permitted by the frictional mounting of the ring 31 on the driving member.

Subsequent forward rotation of the driving member permits the spring 29 to move the coupling member 22 out of engagement with the anchor member 2, whereupon coasting or forward propulsion of the vehicle as above described may be resumed.

Although but one form of the invention has been shown and described in detail, it will be understood that changes may be made in the form and arrangement of the parts without departing from the spirit of the invention.

I claim:

1. In a back-pedalling hub brake for velocipedes and the like a fixed axle, an anchor member non-rotatably mounted thereon, a driving member rotatably mounted on the axle, a cylindrical hub rotatably mounted on the anchor member and the driving member, friction shoes loosely mounted in the hub normally out of contact therewith, means responsive to rotation of the driving member in either forward or backward direction for expanding said shoes into frictional engagement with the interior of the hub, a coupling member non-rotatably connected to said shoes, means normally holding the coupling member out of engagement with the anchor member, and means responsive to backward rotation of the driving member for forcing the coupling member into clutching engagement with the anchor member including a shifter ring having a frictionally retarded swivel connection with the driving member, and having an inclined wedging connection with the coupling member.

2. A hub brake as set forth in claim 1 in which the means for normally holding the coupling member out of engagement with the anchor member comprises a compression spring interposed between said members and bearing frictionally thereon to resist rotation of the coupling member.

3. A hub brake as set forth in claim 1 in which the expanding means for the friction shoes includes a cam sleeve mounted on the driving member having a lost-motion rotary connection therewith, and a plurality of rollers within said shoes, bearing on said cam sleeve.

4. A hub brake as set forth in claim 3 in which said cam sleeve has a polygonal substantially prismatic exterior contour to cause radial movement of the rollers responsive to rotation in either direction.

5. A hub brake as set forth in claim 4 including further, means frictionally connecting the rollers to the interior of said shoes and thereby resisting planetary movement of the rollers with respect to the shoes.

6. A hub brake as set forth in claim 5 in which said frictional connecting means is in the form of a retarder sleeve surrounding the cam sleeve having axial slots receiving and spacing the rollers, and having a spring arm bearing frictionally in the interior of said shoes.

References Cited in the file of this patent

UNITED STATES PATENTS

| | | |
|---|---|---|
| 1,158,751 | Van Deren | Nov. 2, 1915 |
| 1,263,873 | Emerson | Apr. 23, 1918 |
| 2,081,567 | Winkler | May 25, 1937 |
| 2,527,179 | Errig et al. | Oct. 24, 1950 |